US009985526B1

(12) United States Patent
Oak (10) Patent No.: US 9,985,526 B1
(45) Date of Patent: May 29, 2018

(54) SWITCHING REGULATOR WITH SELF BIASING HIGH VOLTAGE SWING SWITCH STACK

(71) Applicant: Empower Semiconductor, Inc., Newark, CA (US)

(72) Inventor: Parag Oak, Sunnyvale, CA (US)

(73) Assignee: EMPOWER SEMICONDUCTOR, Oakland, CA (US)

( * ) Notice: Subject to any disclaimer, the term of this patent is extended or adjusted under 35 U.S.C. 154(b) by 0 days. days.

(21) Appl. No.: 15/640,023

(22) Filed: Jun. 30, 2017

(51) Int. Cl.
*H02M 3/158* (2006.01)
*H02M 3/335* (2006.01)

(52) U.S. Cl.
CPC ....... *H02M 3/158* (2013.01); *H02M 3/33507* (2013.01); *H02M 3/33569* (2013.01)

(58) Field of Classification Search
CPC ............ H02M 1/16; H02M 3/18; H02M 1/32; H02M 1/36; H02M 3/155–3/1588
See application file for complete search history.

(56) References Cited

U.S. PATENT DOCUMENTS

| | | | | |
|---|---|---|---|---|
| 8,330,504 B2* | 12/2012 | Olson | .................. | H03K 17/145 326/82 |
| 8,692,609 B2* | 4/2014 | Olson | .................... | G01R 19/04 327/108 |
| 8,847,636 B2* | 9/2014 | Kerr | ................. | H03K 19/00315 327/108 |
| 9,030,857 B2* | 5/2015 | Martini | .................. | H02M 7/483 363/101 |
| 9,843,258 B2* | 12/2017 | Phillips | .................. | H02M 3/158 |
| 2005/0099364 A1* | 5/2005 | Jung | .................... | G09G 3/2965 345/60 |
| 2008/0157723 A1* | 7/2008 | Xing | ..................... | H02J 7/0068 320/164 |
| 2010/0283439 A1* | 11/2010 | Singh | .................... | H02M 1/088 323/282 |
| 2011/0018511 A1* | 1/2011 | Carpenter | ............. | H02M 3/158 323/282 |
| 2011/0260780 A1* | 10/2011 | Granger-Jones | ..... | H03K 17/102 327/537 |

(Continued)

OTHER PUBLICATIONS

First Action Interview Pilot Program Pre-Interview Communication for U.S. Appl. No. 15/653,262, dated Oct. 5, 2017, 4 pages.

(Continued)

*Primary Examiner* — Yusef A Ahmed
(74) *Attorney, Agent, or Firm* — Kilpatrick Townsend & Stockton (57) ABSTRACT

A switching voltage converter is disclosed. The voltage converter includes a controller configured to generate first and second control signals, and a switch stack including six serially connected switches configured to receive a plurality of fixed voltages and the first and second control signals. The switch stack is configured to generate a voltage signal at a switch node based on the fixed voltages and on the control signals. In addition, the voltage signal is controlled to be substantially equal to a first fixed supply voltage or substantially equal to a second fixed supply voltage according to the first and second control signals, and an output filter connected to the switch node and configured to generate an output voltage based on the voltage at the switch node.

12 Claims, 8 Drawing Sheets

(56) References Cited

U.S. PATENT DOCUMENTS

| | | | | |
|---|---|---|---|---|
| 2012/0326680 A1* | 12/2012 | Burns | | H02M 3/1588 323/224 |
| 2013/0002149 A1* | 1/2013 | Mott | | H02M 1/088 315/161 |
| 2013/0002215 A1* | 1/2013 | Ikeda | | H02M 3/158 323/271 |
| 2013/0083580 A1 | 4/2013 | Komiya et al. | | |
| 2013/0119961 A1* | 5/2013 | Okuda | | H02M 3/158 323/299 |
| 2014/0232364 A1* | 8/2014 | Thomas | | H02M 7/483 323/271 |
| 2014/0266135 A1* | 9/2014 | Zhak | | H02M 1/36 323/311 |
| 2014/0306674 A1* | 10/2014 | Kondou | | H02M 3/158 323/271 |
| 2015/0194904 A1* | 7/2015 | Harbourt | | H02M 7/06 318/503 |
| 2015/0280608 A1* | 10/2015 | Yoscovich | | H02M 7/483 363/131 |
| 2016/0248329 A1* | 8/2016 | Phillips | | H02M 3/158 |
| 2017/0085176 A1* | 3/2017 | Mathe | | H02M 3/158 |
| 2017/0093153 A1* | 3/2017 | Keane | | H02H 9/046 |
| 2017/0244321 A1* | 8/2017 | Phillips | | H02M 3/158 |
| 2018/0006559 A1* | 1/2018 | Chen | | H02M 1/08 |

OTHER PUBLICATIONS

Kursun et al., "High input voltage step-down DC-DC converters for integration in a low voltage CMOS process", International Symposium on Signals, Circuits and Systems. Proceedings, SCS 2003, 2004, pp. 517-521.

Pashmineh et al., "A high-voltage driver based on stacked low-voltage transistors with minimized on-resistance for a buck converter in 65 nm CMOS", 2016 IEEE Canadian Conference on Electrical and Computer Engineering (CCECE), 2016, pp. 1-5.

* cited by examiner

SWITCHING REGULATOR WITH SELF BIASING HIGH VOLTAGE SWING SWITCH STACK

FIELD OF THE INVENTION

The present application generally relates to semiconductor switching power converters, and more particularly to switching power converters having an output stage having more than two switches.

BACKGROUND OF THE INVENTION

Figure 1:
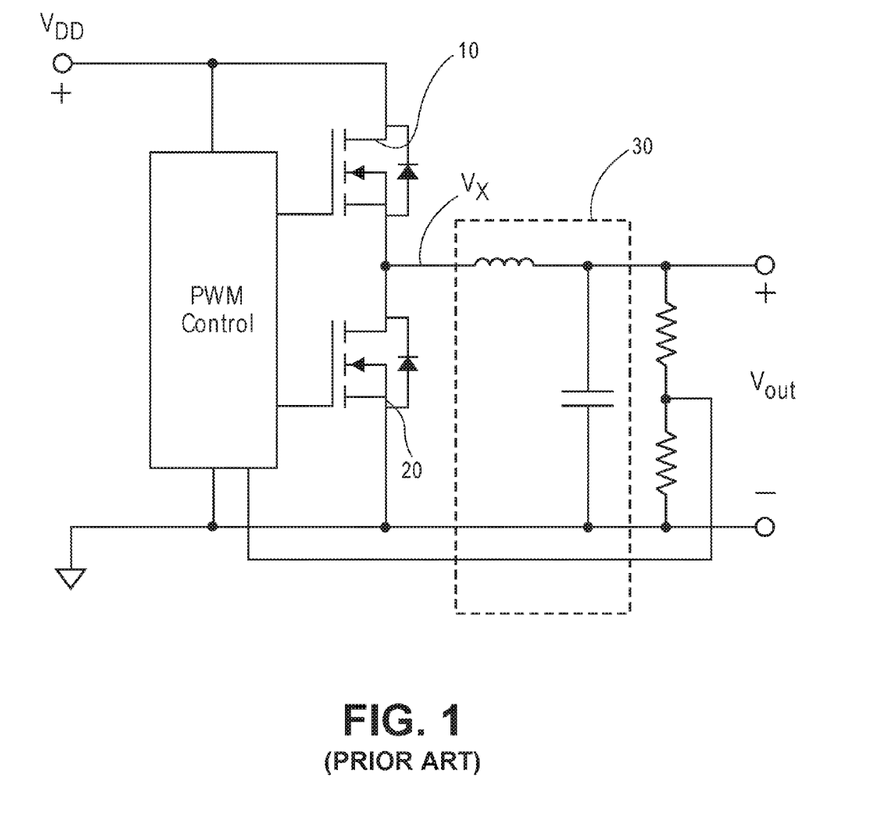
FIG. 1 is a schematic illustration of a conventional power converter.

This application refers generally to switching voltage regulators. These regulators include, but are not limited to, isolate and non-isolated varieties such as buck, buck-boost, boost, flyback, etc. The invention will be described primarily with a single type of regulator, a buck regulator, for clarity. Typical switching regulator power converters, such as that illustrated in FIG. 1, utilize two switches 10 and 20 (e.g. MOSFETs or other transistors) to connect the converter's switch node (Vx) to either Vdd or to ground. The switch node can present a pulse-width modulated square wave with its high-level substantially at the voltage of Vdd and its low-level substantially at the ground voltage of the input of a second order output filter 30. The output filter time-averages the switch node square wave to present a filtered output voltage that is proportional to the amount of time per cycle the switch node is connected to Vdd.

Each switch in this typical configuration must be able to block the full voltage across Vdd and ground while off and while turning on. Therefore, each switch must have a minimum breakdown voltage equal to the input voltage plus a margin. In practice, it is typical to have the minimum breakdown voltage equal to two times the voltage across Vdd and ground in discrete circuits where parasitic reactance in the interconnect causes voltage spiking that can be destructive.

Transistors, such as MOSFETs performance characteristics are dramatically impacted by their breakdown voltage. Two critical performance metrics in a MOSFET are its RDSon and gate charge (Qg). In general, MOSFET RDSon per unit area is proportional to the square of its breakdown voltage. In addition, required Qg to turn on the MOSFET is proportional to the area of gate and the thickness of the oxide underneath the gate. Higher voltage MOSFETs typically feature a thicker gate oxide which increases the Qg. This is compounded by the aforementioned fact that the gate area of a higher voltage MOSFET must be exponentially larger to achieve the same RDSon as a lower voltage version, thus exponentially increasing Qg as well.

Since losses in a MOSFET are proportional to both RDSon and Qg, reducing the blocking requirements on the MOSFETs in a voltage regulator is highly advantageous.

BRIEF SUMMARY OF THE INVENTION

One inventive aspect is a switching voltage converter. The voltage converter includes a controller configured to generate first and second control signals, and a switch stack including six serially connected switches configured to receive a plurality of fixed voltages and the first and second control signals. The switch stack is configured to generate a voltage signal at a switch node based on the fixed voltages and on the control signals. In addition, the voltage signal is controlled to be substantially equal to a first fixed supply voltage or substantially equal to a second fixed supply voltage according to the first and second control signals, and an output filter connected to the switch node and configured to generate an output voltage based on the voltage at the switch node.

In some embodiments, the switch stack includes a first switch connected to a first fixed voltage supply configured to provide current substantially at the first fixed supply voltage, where the first switch is configured to receive the first control signal, and where the conductivity state of the first switch is controlled by the first control signal. In some embodiments, the switch stack also includes a sixth switch connected to a second fixed voltage supply configured to provide current substantially at the second fixed supply voltage, where the sixth switch is configured to receive the second control signal, and where the conductivity state of the sixth switch is controlled by the second control signal.

In some embodiments, the switch stack further includes a second switch connected to the first switch, where the second switch is configured to receive a second fixed bias voltage, and where the conductivity state of the second switch is controlled by a voltage at a node connected to the first and second switches. In some embodiments, the switch stack also includes a fifth switch connected to the sixth switch, where the fifth switch is configured to receive a first fixed bias voltage, and where the conductivity state of the fifth switch is controlled by a voltage at a node connected to the fifth and sixth switches.

In some embodiments, the switch stack further includes a third switch connected to the second switch, where the third switch is configured to receive a variable bias signal, and where the conductivity state of the third switch is controlled by the variable bias signal. In some embodiments, the switch stack further includes a fourth switch connected to the fifth switch, where the fourth switch is configured to receive the variable bias signal, and where the conductivity state of the fourth switch is controlled by the variable bias signal.

In some embodiments, the switch stack further includes seventh and eighth switches configured to cooperatively generate the variable bias signal based on third and fourth control signals.

In some embodiments, the third and fourth control signals are generated by the switch stack.

In some embodiments, the third control signal is generated at a node connected to the second and third switches, and the fourth control signal is generated at a node connected to the third and fourth switches.

In some embodiments, the seventh switch is configured to receive the second fixed bias signal and the eighth switches configured to receive the first fixed bias signal, and the seventh and eighth switches are configured to cause the variable bias signal to vary between the voltages of the first and second fixed bias signals according to the third and fourth control signals.

In some embodiments, the first control signal is configured to switch between the second fixed bias voltage and the first fixed supply voltage, and the second control signal is configured to switch between the first fixed bias voltage and the second fixed supply voltage.

In some embodiments, the switch stack is configured to provide a current to the output filter, and the current provided to the output filter substantially linearly increases or substantially linearly decreases based on the voltage signal at the switch node.

In some embodiments, when the voltage signal is substantially equal to the first fixed supply voltage or is substantially equal to the second fixed supply voltage, the voltage across any two nodes connected to a single switch is less than a breakdown voltage of the single switch.

In some embodiments, the serially connected switches are connected to a plurality of nodes, where when first and second control signals do not cause the voltage signal to be substantially equal to the first fixed supply voltage or to be substantially equal to the second fixed supply voltage, voltage changes at the switch node cause changes in the voltages of the other nodes such that the voltage across any two nodes connected to a single switch is less than a breakdown voltage of the single switch.

Another inventive aspect is a switching voltage converter. The voltage converter includes a controller configured to generate first and second control signals, and a switch stack configured to generate a voltage signal at a switch node based on the control signals. The voltage signal is controlled to be substantially equal to a first fixed supply voltage or substantially equal to a second fixed supply voltage according to the control signals. In addition, the switch stack includes a first switch configured to receive the first control signal, a second switch connected to the switch node, a third switch connected to the switch node, and a fourth switch configured to receive a second control signal. The first, second, third, and fourth are serially connected, and the conductivity states of the second and third switches are controlled by control voltages generated by the switch stack. The voltage converter also includes an output filter connected to the switch node and configured to generate an output voltage based on the voltage at the switch node.

In some embodiments, the first switch is connected to a first fixed voltage supply configured to provide current substantially at the first fixed supply voltage, and the conductivity state of the first switch is controlled by the first control signal. In addition, the fourth switch is connected to a second fixed voltage supply configured to provide current substantially at the second fixed supply voltage, where the fourth switch is configured to receive the second control signal, and where the conductivity state of the fourth switch is controlled by the second control signal.

In some embodiments, the second switch is configured to receive a variable bias signal, and the conductivity state of the second switch is controlled by the variable bias signal. In addition, the third switch is configured to receive the variable bias signal, and the conductivity state of the third switch is controlled by the variable bias signal.

In some embodiments, the switch stack further includes fifth and sixth switches configured to cooperatively generate the variable bias signal based on the control voltages generated by the switch stack.

In some embodiments, the fifth switch is configured to receive a second fixed bias signal and the sixth switch is configured to receive a first fixed bias signal, and the fifth and sixth switches are configured to cause the variable bias signal to vary between the voltages of the first and second fixed bias signals according to the control voltages generated by the switch stack.

In some embodiments, the switch stack is configured to provide a current to the output filter, where the current provided to the output filter substantially linearly increases or substantially linearly decreases based on the voltage signal at the switch node.

In some embodiments, when the voltage signal is substantially equal to the first fixed supply voltage or is substantially equal to the second fixed supply voltage, the voltage across any two nodes connected to a single switch is less than a breakdown voltage of the single switch.

In some embodiments, the switches of the switch stack are connected to a plurality of nodes, and when the first and second control signals do not cause the voltage signal to be substantially equal to the first fixed supply voltage or to be substantially equal to the second fixed supply voltage, voltage change's at the switch node cause changes in the voltages of the other plurality of nodes such that the voltage across any two nodes connected to a single switch is less than a breakdown voltage of the single switch.

DETAILED DESCRIPTION OF THE INVENTION

Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein. For example, certain aspects and principles are discussed with reference to a buck switching power converter. However, as understood by those of ordinary skill in the art, the various aspects and principles may be used in embodiments of other types of switching power converters, such as resonant, boost, buck-boost, and flyback regulators. Furthermore, as understood by those of ordinary skill in the art, while the various aspects and principles are discussed herein with reference to use of a pulse width modulation (PWM) controller, other controllers and control schemes are used in alternative embodiments. In addition, in the embodiments discussed below, MOSFETs are used. However, in some embodiments other transistors or other switches are used.

Figure 2:
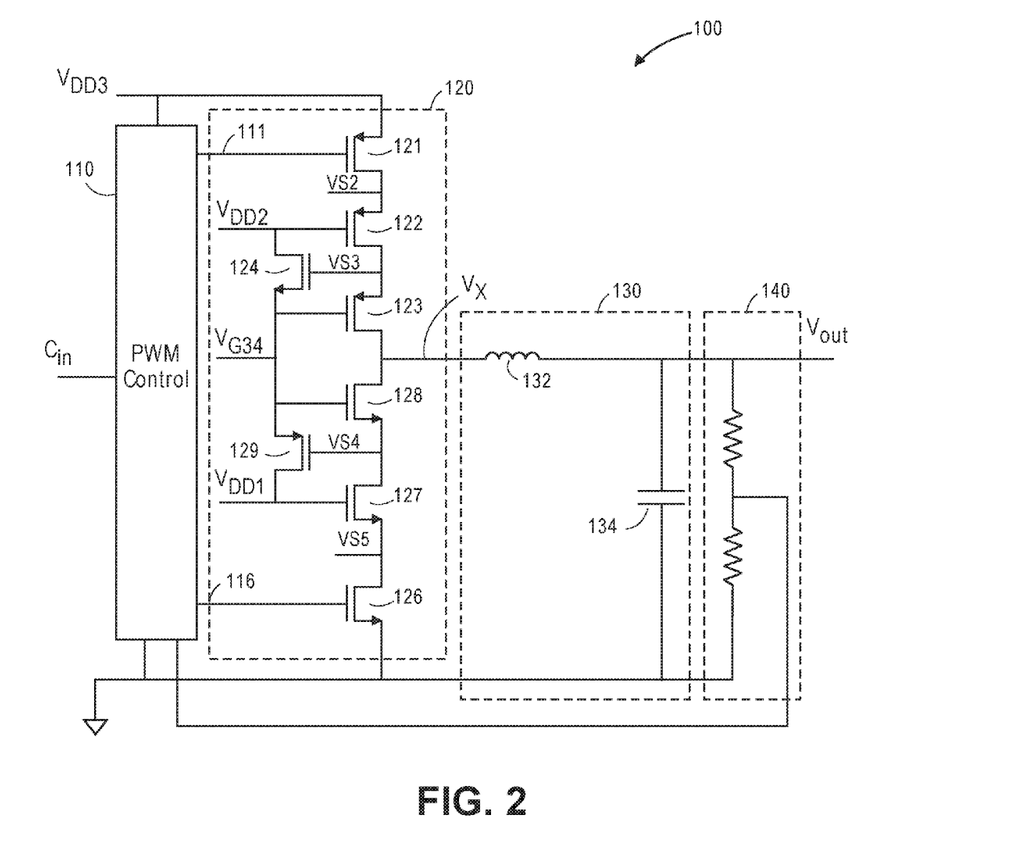
FIG. 2 is a schematic illustration of a power converter according to an embodiment.

FIG. 2 is a schematic illustration of a buck power converter according to an embodiment.

In order to avoid the aforementioned performance limitation of using power switches with breakdown voltages that are less than $V_{DD3}$, cascode output stages ("FET stacking") may be used. For example, as shown in FIG. 2, a series connection of MOSFETs can be used so that the resulting breakdown voltage of the series connected switches is equal to the sum of the breakdown voltages of the individual switches. Thus, one can utilize relatively low-voltage switches in a high-voltage application.

FIG. 2 illustrates converter 100, which includes pulse width modulation (PWM) controller 110, switch stack 120, output filter 130, and voltage feedback generator 140. Converter 100 is configured to generate a substantially DC voltage at output terminal Vout based on a received reference voltage at input terminal Cin and a received feedback voltage representing the output voltage Vout of the regulator.

In some embodiments, the PWM controller 110 and the switch stack 120 are integrated on a single integrated circuit semiconductor substrate, for example, comprising a semiconductor, such as single-crystalline silicon. In some embodiments, the PWM controller 110, the switch stack 120, and the filter 130 are integrated on a single integrated circuit semiconductor substrate, for example, comprising a semiconductor, such as single-crystalline silicon. In some embodiments, the PWM controller 110, the switch stack 120, the filter 130, and the voltage feedback generator 140 are integrated on a single integrated circuit semiconductor substrate, for example, comprising a semiconductor, such as single-crystalline silicon.

In some embodiments, the PWM controller 110 and the switch stack 120 are integrated on a single package substrate, for example, on a package substrate within an integrated circuit package having a semiconductor die attached thereto. In some embodiments, the PWM controller 110, the switch stack 120, and the filter 130 are integrated on a single package substrate, for example, on a package substrate within an integrated circuit package having a semiconductor die attached thereto. In some embodiments, the PWM controller 110, the switch stack 120, the filter 130, and the voltage feedback generator 140 are integrated on a single package substrate, for example, on a package substrate within an integrated circuit package having a semiconductor die attached thereto.

PWM controller 110 is configured to receive an input signal at Cin and to directly or indirectly generate PWM signals for switch stack 120 at nodes 111 and 116. In some embodiments, the PWM signals switch at a frequency greater than or equal to 1 MHz. In some embodiments, PWM controller 110 is replaced by another controller, such as a constant on-time controller, a hysteretic controller, or a resonant controller. Other controllers may be alternatively used. The PWM signals correspond with the controller type. In this example, the PWM controller generates control signals which are PWM signals. In other embodiments, the control signals may not be PWM, but other types of control signals which correspond with the type of controller used. For example, in some embodiments, PWM controller 110 is replaced by another controller, such as a constant on-time controller, a current mode controller, or a resonant controller. Other controllers may be alternatively used. In some embodiments, the controller 110 generates the signals at for switch stack 120 at nodes 111 and 116 directly, as illustrated in FIG. 2. In alternative embodiments, controller 110 indirectly generates the signals at for switch stack 120 at nodes 111 and 116, for example, by driving other circuitry, where the other circuitry drives nodes 111 and 116 in response to being driven by the controller 110.

In some embodiments, circuitry between what might be considered the "controller" and switch stack 120 is used to condition, buffer, delay, or otherwise process signals from the "controller" for the switch stack 120 may be, for the purposes of this application part of the controller.

Switch stack 120 is configured to receive the PWM signals at nodes 111 and 116, and to alternately and repeatedly drive output filter 130 with an output voltage signal at switch node Vx substantially equal to the voltage at input terminal VDD3 and ground. For example, during a first time period, switch stack 120 drives output filter 130 with an output signal voltage substantially equal to the voltage at VDD3, and during a next, second time period, switch stack 120 drives output filter 130 with a output signal voltage substantially equal to the ground voltage. Switch stack 120 repeatedly alternates between driving the output filter 130 with the output signal voltage substantially equal to the voltage at input terminal VDD3 and substantially equal to ground, such that the proportion of time during which switch stack 120 drives the output filter 130 with the output signal voltage substantially equal to the voltage at input terminal VDD3 is substantially equal to the ratio of the desired output voltage to the voltage at input terminal Vdd3. Accordingly, the output voltage signal may have an average voltage corresponding with a duty cycle or an inverse of the duty cycle of the PWM signals at nodes 111 and 116.

Output filter 130 receives the PWM voltage from switch stack 120 at node Vx, and generates a filtered or substantially DC voltage at output terminal Vout. In this embodiment, the output filter 130 comprises an inductor 132 and a capacitor 134. In alternative embodiments, alternative filter architectures are used.

In this embodiment, a voltage divided version of the DC voltage at output terminal Vout is fed back to PWM controller 110. In some embodiments, PWM controller 110 is configured to directly or indirectly adjust the PWM signals at nodes 111 and 116 so as to generate a desired DC voltage at output terminal Vout. In some embodiments, the desired reference DC voltage may be received at input Cin. In some embodiments, a digital signal representing the desired DC voltage may be received at input Cin. In some embodiments, input Cin is configured to additionally or alternatively receive other control information, such as frequency information. In some embodiments, alternate feedback schemes are used. For example, in some embodiments, the DC voltage at output terminal Vout is fed back to PWM controller 110, and no resistor divider network is used.

Switch stack 120 may include multiple types of MOSFETs. Switch stack 120 includes fast and power efficient switches having structures consistent with MOSFETs located in internal portions of an integrated circuit, and can be referred to as core transistors. In addition, switch stack 120 includes high voltage tolerance switches which can have structures consistent with MOSFETs located in peripheral portions of the integrated circuit, and are called I/O transistors.

Core transistors typically have thinner gate oxide than the I/O transistors. For example, in some manufacturing processes, the gate oxide thickness of a core transistor may be about 1.2 nm, and the gate oxide thickness of the I/O transistors may be about 4.1 nm. Core transistors and I/O transistors may have other gate oxide thicknesses as well. In some embodiments, the gate oxide thickness of I/O transistors may be about 1.5, about 2, about 2.5, about 3, about 3.5, about 4, or more times the gate oxide thickness of core transistors.

In addition, core transistors typically have shorter minimum gate lengths and correspondingly low RDSon as compared with the I/O transistors. For example, in some manufacturing processes, the minimum gate length for core transistors may be about 28 nm, and the minimum gate length for I/O transistors may be about 150 nm.

Furthermore, core transistors typically have lower gate to source, gate to drain, and drain to source breakdown voltages than I/O transistors.

Other differences between core transistors and I/O transistors may exist, as understood by one of skill in the art.

In the embodiment of FIG. 2, switch stack 120 includes P-type MOSFETs 121, 122, and 123, and includes N-type MOSFETs 126, 127, and 128.

In some embodiments, MOSFETs 121, 122, 126, and 127 are core transistors, and MOSFETs 123 and 128 are I/O transistors. However, all combinations of core and I/O transistors are contemplated. For example, in some embodiments, MOSFETs 122, 123, 127, and 128 are I/O transistors, and MOSFETs 121 and 126 are core transistors. In alternative embodiments, MOSFETs 121, 122, 123, 126, 127, and 128, are all either core transistors or I/O transistors.

In the embodiment of FIG. 2, MOSFETs 122 and 127 receive bias voltages at their gates respectively connected to one of the bias voltage inputs VDD2 and VDD3, and are not switched.

In addition, the MOSFETs 123 and 128 receive bias voltages at their gates selectively connected to either of the bias voltage inputs VDD2 and VDD3. Which one of the bias voltage inputs VDD2 and VDD3 is connected to the gates of MOSFETs 123 and 128 is determined by the conductivity state of MOSFETs 124 and 129 in response to the control signals at nodes 111 and 116, as discussed in further detail below.

Figure 3:
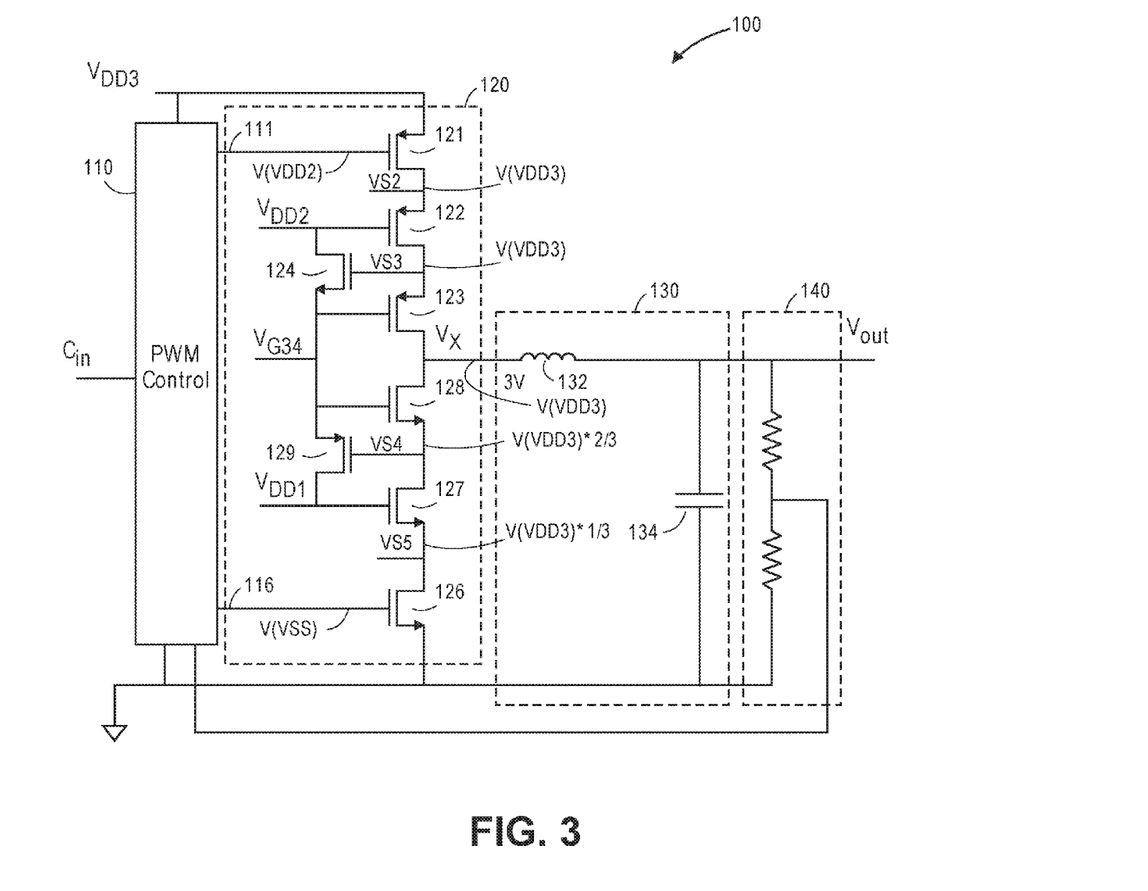
FIG. 3 is a schematic illustration of the converter of FIG. 2 generating a high output voltage.

FIG. 3 is a schematic illustration of converter 100 while the output of switch stack 120 is substantially equal to the voltage at VDD3. Voltages are indicated at the various nodes of switch stack 120. In this embodiment, VDD2=⅔ VDD3 and VDD1=⅓ VDD3.

In response to the voltage at VS3 being equal to the voltage at VDD3 and the voltage at VS4 being equal to ⅓ the voltage at VDD3, MOSFET 124 is conductive and MOSFET 129 is substantially nonconductive so that the voltage at the gates of MOSFETs 123 and 128 is equal to the voltage at VDD2. Consequently, the voltages at nodes VS3 and VS4 are control signals for MOSFETs 124 and 129, respectively.

As an example, the voltage at input terminal VDD3 may be equal to 3 V, and the bias voltages at bias voltage inputs VDD2 and VDD1 may respectively be 2 V and 1 V. in addition, the signals applied to the gates of MOSFETs 121 and 126 at nodes 111 and 116 are respectively 2 V and 0 V. Furthermore, the ground voltage may be 0 V.

In response to their gate voltages, MOSFETs 126, 127, and 128 are substantially nonconductive, and MOSFETs 121, 122, and 123 are conductive. Consequently, the voltage at the output of switch stack 120 at node Vx is 3 V. In this state, a traditional stack could experience voltage overstressing if low breakdown voltage devices were used because the voltages across the switch terminals would be greater than the breakdown voltage for a time duration sufficient to damage the switches. As a result of overstressing, the MOSFETs 126, 127, and 128 would be at risk of being damaged. However, because of their bias voltages, MOSFETs 126, 127, and 128 do not experience overstressing.

MOSFET 128 has a Vds of 1 V, a Vgs of 0 V, and a Vdg of 1 V, and therefore does not experience overstressing. MOSFET 127, has a Vds of 1 V, a Vgs of 0 V, and a Vdg of 1 V, and therefore does not experience overstressing. MOSFET 126 has a Vds of 1 V, a Vgs of 0 V, and a Vdg of 1 V, and therefore does not experience overstressing.

MOSFETs 129 and 124 also do not experience overstressing. MOSFET 129 has a Vds of 1 V, a Vgs of 0 V, and a Vdg of 1 V, and MOSFET 124 has a Vds of 0 V, a Vgs of 1 V, and a Vdg of 1 V.

MOSFET 121 has a Vds of 0 V, a Vgs of 1 V, and a Vdg of 1 V, and therefore does not experience overstressing. MOSFET 122, has a Vds of 0 V, a Vgs of 1 V, and a Vdg of 1 V, and therefore does not experience overstressing. MOSFET 123 has a Vds of 0 V, a Vgs of 1 V, and a Vdg of 1 V, and therefore does not experience overstressing.

Therefore, none of the MOSFETs experience overstressing with low-voltage inputs and high-voltage output because the voltages across any two nodes connected to a single MOSFET are less than the breakdown voltages of the MOSFET.

The exact voltages discussed herein are approximate and are typically dependent on characteristics such as the threshold voltage and RDSon of one or more of the MOSFETs. In some embodiments, the bias voltages are modified from the values indicated in FIG. 3. For example, in some embodiments, the bias voltages are modified so as to compensate for variations in characteristics of one or more of the MOSFETs.

Figure 4:
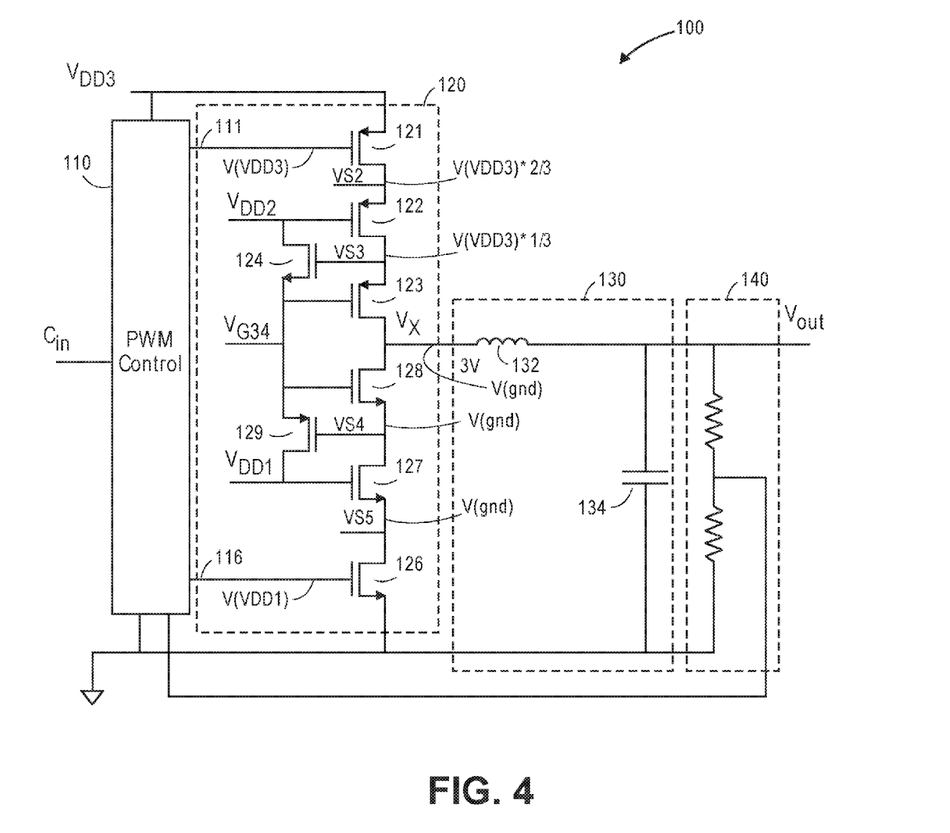
FIG. 4 is a schematic illustration of the converter of FIG. 2 generating a low output voltage.

FIG. 4 is a schematic illustration of converter 100 while the output of switch stack 120 is substantially equal to the ground voltage. Voltages are indicated at the various nodes of switch stack 120. In this embodiment, VDD2=⅔ VDD3 and VDD1=⅓ VDD3.

In response to the voltage at VS3 being equal to ⅓ the voltage at VDD3 and the voltage at VS4 being equal to the ground voltage, MOSFET 124 is substantially nonconductive and MOSFET 129 is conductive so that the voltage at the gates of MOSFETs 123 and 128 is equal to the voltage at VDD1.

As an example, the voltage at input terminal VDD3 may be equal to 3 V, and the bias voltages at bias voltage inputs VDD2 and VDD1 may respectively be 2 V and 1 V. in addition, the signals applied to the gates of MOSFETs 121 and 126 at nodes 111 and 116 are respectively 3 V and 1 V. Furthermore, the ground voltage may be 0 V.

In response to their gate voltages, MOSFETs 126, 127, and 128 are conductive, and MOSFETs 121, 122, and 123 are substantially nonconductive. Consequently, the voltage at the output of switch stack 120 at node Vx is 0 V. In this state, a traditional stack could experience voltage overstress if low BVDSS devices were used. As a result, the MOSFETs 121, 122, and 123 would be at risk of experiencing damaging overstressing. However, because of their bias voltages, MOSFETs 121, 122, and 123 do not experience overstressing.

MOSFET 123 has a Vds of 1 V, a Vgs of 0 V, and a Vdg of 1 V, and therefore does not experience overstressing. MOSFET 122, has a Vds of 1 V, a Vgs of 0 V, and a Vdg of 1 V, and therefore does not experience overstressing. MOSFET 121 has a Vds of 1 V, a Vgs of 0 V, and a Vdg of 1 V, and therefore does not experience overstressing.

MOSFETs 124 and 129 also do not experience overstressing. MOSFET 124 has a Vds of 1 V, a Vgs of 0 V, and a Vdg of 1 V, and MOSFET 129 has a Vds of 0 V, a Vgs of 1 V, and a Vdg of 1 V.

MOSFET 126 has a Vds of 0 V, a Vgs of 1 V, and a Vdg of 1 V, and therefore does not experience overstressing. MOSFET 127, has a Vds of 0 V, a Vgs of 1 V, and a Vdg of 1 V, and therefore does not experience overstressing. MOSFET 128 has a Vds of 0 V, a Vgs of 1 V, and a Vdg of 1 V, and therefore does not experience overstressing.

Therefore, none of the MOSFETs experience overstressing with high-voltage inputs and low-voltage output because the voltages across any two nodes connected to a single MOSFET are less than the breakdown voltages of the MOSFET.

In the illustrated embodiments, switch stack 120 includes six serially connected MOSFET switches. In alternative embodiments, switch stacks having features described herein have fewer or more serially connected switches.

In some embodiments, a switch stack has a set of three serially connected switches having features and operation similar or identical to either the set of switches including MOSFETs 121, 122, and 123 or the set of switches including MOSFETs 126, 127, and 128. In embodiments having a set of three serially connected switches having features and operation similar or identical to the set of switches including MOSFETs 121, 122, and 123, a pull-down circuit controlled by the signal at node 116 may be different from the circuitry of the illustrated embodiments which selectively connects switch node Vx with ground. Similarly, in embodiments having a set of three serially connected switches having features and operation similar or identical to the set of switches including MOSFETs 126, 127, and 128, a pull-down circuit controlled by the signal at node 111 may be different from the circuitry of the illustrated embodiments which selectively connects switch node Vx with input terminal VDD3.

Figure 5:
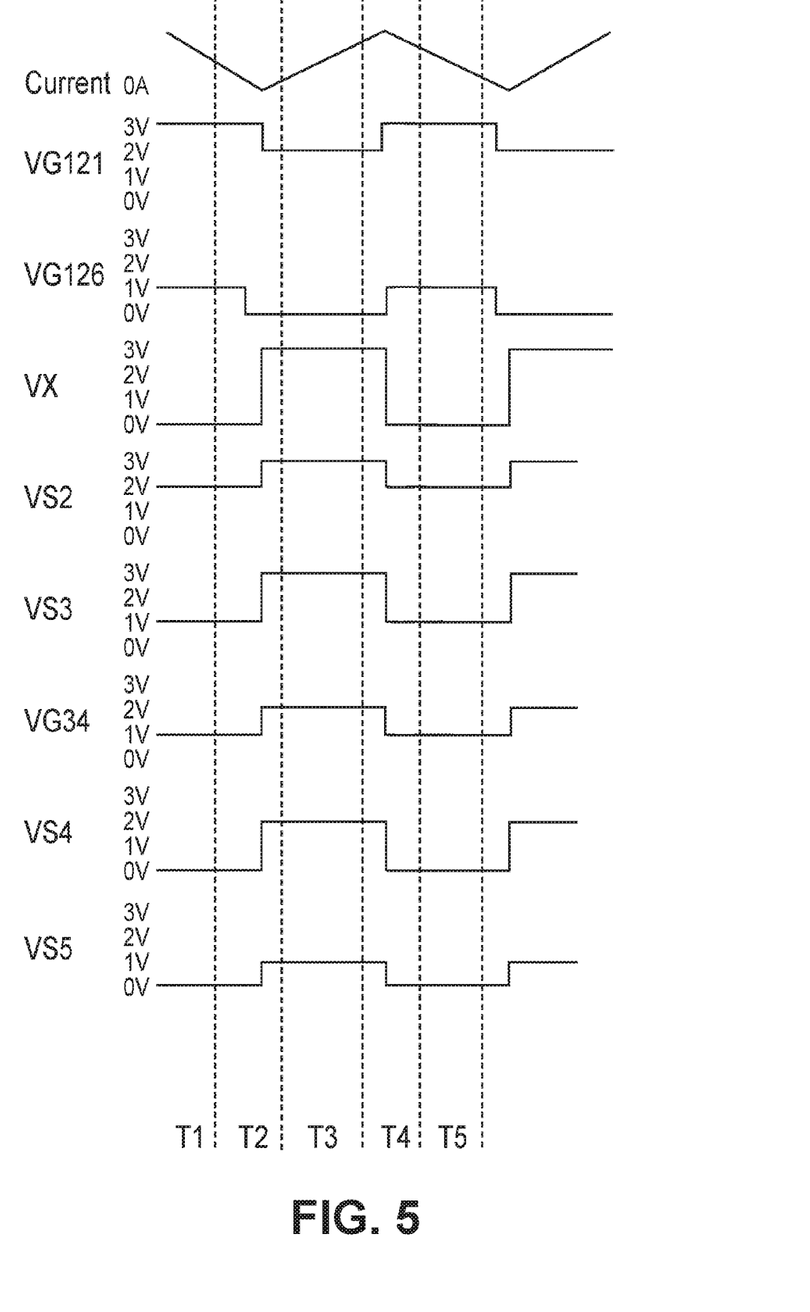
FIG. 5 is a waveform diagram illustrating a converter output transitioning between low and high values.

FIG. 5 is a waveform diagram illustrating a continuous current mode (CCM) operation of an embodiment.

The waveform diagram illustrates transitions between 0 V and 3 V at the switch node Vx of switch stack 120 in response to input signals applied to the gates of MOSFETs 121 and 126. In this embodiment, the current to the output filter 130 from switch node Vx transitions between two positive values as the voltage at the switch node Vx transitions between 0 V and 3 V. The current transitions are substantially linear because, during the transitions, the outputs of the switch stack 120 and the converter 100 at Vout are both substantially constant.

As discussed in further detail below, the MOSFETs do not experience overstressing because the voltages of the various nodes of the circuit change in response to the conductivity state of MOSFETs 121 and 126 in such a way that the voltages across any two terminals of the MOSFETs of the circuit is less than the breakdown voltage of the MOSFETs and does not result in overstressing the MOSFETs.

In this embodiment, the controller is configured to generate input signals with a dead time between MOSFET 121 or 126 turning off and the other of MOSFET 121 or 126 turning on. As a result, MOSFETs 121 and 126 are not simultaneously on.

Referring to FIG. 5, during the time period T1, the voltages at the nodes of switch stack 120 have states shown in the following table:

| Node | Voltage during time period T1 |
|---|---|
| VDD3 | 3 V |
| VDD2 | 2 V |
| VG121 | 3 V |
| VG126 | 1 V |
| VX | 0 V |
| VS2 | 2 V |
| VS3 | 1 V |
| VG34 | 1 V |
| VS4 | 0 V |
| VS5 | 0 V |
| VDD1 | 1 V |
| VSS | 0 V |

During the time period T2, the gate voltage of MOSFET 126 (VG126) transitions from 1 V to 0 V, and in response, MOSFET 126 turns off, or become substantially nonconductive. After the dead time, the gate voltage of MOSFET 121 (VG121) transitions from 3 V to 2 V, and in response, MOSFET 121 turns on, or becomes conductive.

In response to MOSFET 121 becoming conductive, the voltage at node VS2 transitions from 2 V to 3 V, causing MOSFET 122 to become conductive. In response to MOSFET 122 becoming conductive, the voltage at node VS3 transitions from 1 V to 3 V, causing MOSFETs 123 and 124 to become conductive. In response to MOSFET 124 becoming conductive, the voltage at node VG34 transitions from 1 V to 2 V, and in response to MOSFET 123 becoming conductive, the voltage at switch node VX transitions from 0 V to 3 V.

In response to the voltage at switch node Vx transitioning to 3 V, MOSFET 128 becomes conductive, and the voltage the source of MOSFET 128 (VS4) transitions from 0 V to 2 V. Once the source voltage of MOSFET 128 reaches 2 V, the Vgs of MOSFET 128 is 0 V, and MOSFET 128 turns off or becomes substantially nonconductive.

In response to the voltage at the source of MOSFET 128 transitioning from 0 V to 2 V, MOSFET 127 becomes conductive, and the voltage the source of MOSFET 127 (VS5) transitions from 0 V to 1 V. Once the source voltage of MOSFET 127 reaches 1 V, the Vgs of MOSFET 127 is 0 V, and MOSFET 127 turns off or becomes substantially nonconductive.

Because MOSFETs 127 and 128 turn off in response to their respective source voltages transitioning to 1 V and 2 V, the architecture prevents shoot through current between MOSFETs 123 and 128, or limits shoot through charge to that which charges the source voltages of MOSFETs 127 and 128 to 1 V and 2 V.

Referring to FIG. 5, the voltages at the nodes of switch stack 120 during time period T1 and during time period T3, resulting from the transitions occurring during time period T2, have states shown in the following table:

| Node | Voltage during time period T1 | Voltage during time period T3 |
|---|---|---|
| VDD3 | 3 V | 3 V |
| VDD2 | 2 V | 2 V |
| VG121 | 3 V | 2 V |
| VG126 | 1 V | 0 V |
| VX | 0 V | 3 V |
| VS2 | 2 V | 3 V |
| VS3 | 1 V | 3 V |
| VG34 | 1 V | 2 V |
| VS4 | 0 V | 2 V |
| VS5 | 0 V | 1 V |
| VDD1 | 1 V | 1 V |
| VSS | 0 V | 0 V |

During the time period T4, the gate voltage of MOSFET 121 (VG121) transitions from 2 V to 3 V, and in response, MOSFET 121 turns off, or becomes substantially nonconductive. After the dead time, the gate voltage of MOSFET 126 (VG126) transitions from 0 V to 1 V, and in response, MOSFET 126 turns on, or become conductive.

In response to MOSFET 126 becoming conductive, the voltage at node VS5 transitions from 1 V to 0 V, causing MOSFET 127 to become conductive. In response to MOSFET 127 becoming conductive, the voltage at node VS4 transitions from 2V to 0 V, causing MOSFETs 128 and 129 to become conductive. In response to MOSFET 129 becoming conductive, the voltage at node VG34 transitions from 2 V to 1 V, and in response to MOSFET 128 becoming conductive, the voltage at switch node VX transitions from 3 V to 0 V.

In response to the voltage at switch node VX transitioning to 0 V, MOSFET 123 becomes conductive, and the voltage the source of MOSFET 123 (VS3) transitions from 3 V to 1 V. Once the source voltage of MOSFET 123 reaches 1 V, the Vgs of MOSFET 123 is 0 V, and MOSFET 123 turns off or becomes substantially nonconductive.

In response to the voltage at the source of MOSFET 123 transitioning from 3 V to 1 V, MOSFET 122 becomes conductive, and the voltage the source of MOSFET 122 (VS2) transitions from 3 V to 2 V. Once the source voltage of MOSFET 122 reaches 2 V, the Vgs of MOSFET 122 is 0 V, and MOSFET 122 turns off or becomes substantially nonconductive.

Because MOSFETs 122 and 123 turn off in response to their respective source voltages transitioning to 2 V and 1 V, the architecture prevents shoot through current between MOSFETs 123 and 128, or limits shoot through charge to that which respectively discharges the source voltages of MOSFETs 122 and 123 to 2 V and 1 V.

Referring to FIG. 5, the voltages at the nodes of switch stack 120 during time periods T1, T3, and during time period T5, resulting from the transitions occurring during time period T4, have states shown in the following table:

| Node  | Voltage during time period T1 | Voltage during time period T3 | Voltage during time period T5 |
|-------|-------------------------------|-------------------------------|-------------------------------|
| VDD3  | 3 V | 3 V | 3 V |
| VDD2  | 2 V | 2 V | 2 V |
| VG121 | 3 V | 2 V | 3 V |
| VG126 | 1 V | 0 V | 1 V |
| VX    | 0 V | 3 V | 0 V |
| VS2   | 2 V | 3 V | 2 V |
| VS3   | 1 V | 3 V | 1 V |
| VG34  | 1 V | 2 V | 1 V |
| VS4   | 0 V | 2 V | 0 V |
| VS5   | 0 V | 1 V | 0 V |
| VDD1  | 1 V | 1 V | 1 V |
| VSS   | 0 V | 0 V | 0 V |

Figure 6:
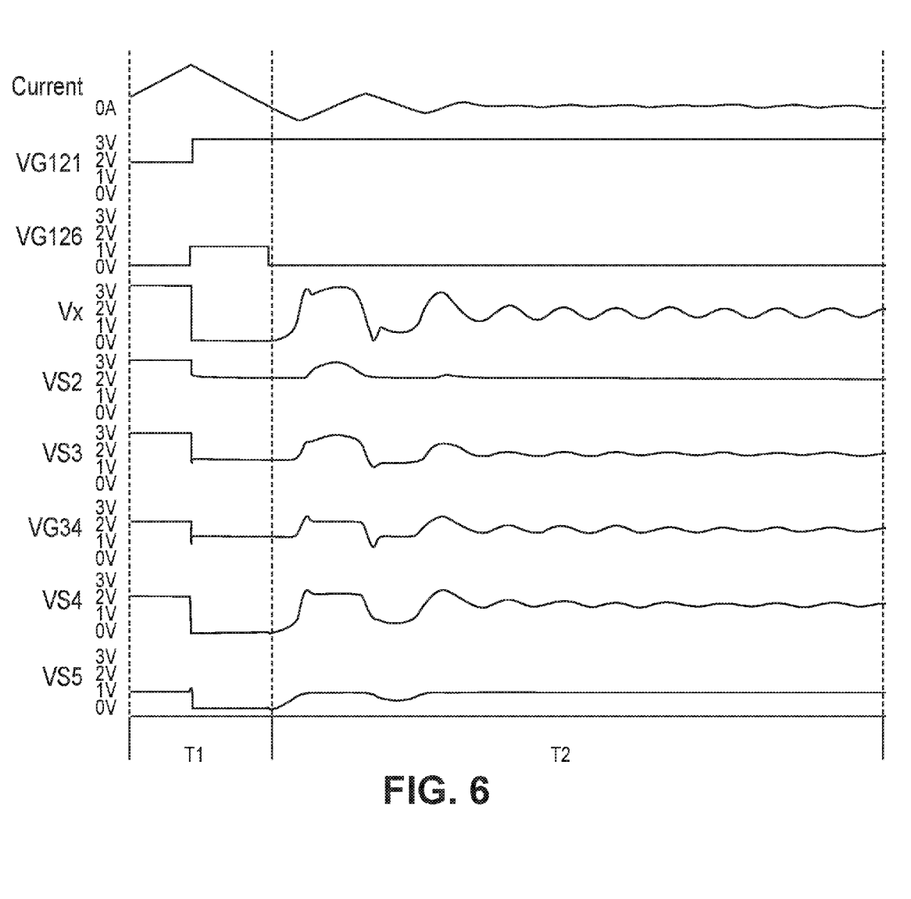
FIG. 6 is a waveform diagram illustrating a converter output transitioning between low and high values.

FIG. 6 is a waveform diagram illustrating a discontinuous current mode (DCM) operation of an embodiment.

During time period T1, other than during a dead time between pulses on nodes VG1 and VG6, one of MOSFETs 121 and 126 is on, and the waveform diagram illustrates transitions between 0 V and 3 V at the switch node Vx of switch stack 120 in response to input signals applied to the gates of MOSFETs 121 and 126. During time period T1, the node voltages and transitions are similar or identical to those discussed above with reference to FIG. 5.

In this embodiment, the current to the output filter 130 is a triangular pulse, and transitions between 0 A and a positive value as the voltage at the switch node Vx transitions between 0 V and 3 V. The current transitions are substantially linear because, during the transitions, the outputs of the switch stack 120 and the converter 100 at Vout are both substantially constant.

During time period T2, both of MOSFETs 121 and 126 are off. Accordingly, the voltage at switch node Vx is not influenced by current sourced by MOSFET 121 or sunk by MOSFET 126. Instead, the illustrated oscillations in the voltage at switch node Vx occurs as a result of the LC tank circuit of the output filter 130.

An advantageous aspect of the architecture discussed herein is that the oscillations at the switch node Vx do not cause overstressing of the MOSFETs, as is the case with other architectures. As discussed in further detail below, the MOSFETs do not experience overstressing because the source voltages of MOSFETs 123 and 128 change in response to the voltage at switch node Vx, and the gate voltages of MOSFETs 123 and 128 are generated by the architecture in response to voltages at the sources of MOSFETs 123 and 128 in such a way that the voltages across any two terminals of the MOSFETs of the circuit is limited and does not result in overstressing the MOSFETs.

Referring to FIG. 6, during time period 2, other than brief voltage excursions caused by capacitive coupling while the oscillations in the voltage at switch node Vx are particularly large, and which do not cause overstressing because of their short duration, the voltages of the various nodes generally track the voltage oscillations at the switch node Vx.

More specifically, as discussed above, oscillations in the voltage at switch node Vx occurs as a result of the LC tank circuit of the output filter 130. In response to the relatively higher voltages at switch node Vx, the voltage at node VS3 increases, and in response to the voltage at node VS3 increasing, the voltages at nodes VS2 and VG34 also increase. In response to the voltage at node VG34 and/or in response to the voltage at switch node Vx increasing, the voltage at node VS4 increases, and in response to the voltage at node VS4 increasing, the voltage at node VS5 increases.

In addition, in response to the relatively lower voltages at switch node Vx, the voltage at node VS4 decreases, and in response to the voltage at node VS4 decreasing increasing, the voltages at nodes VS5 and VG34 also decrease. In response to the voltage at node VG34 and/or in response to the voltage at switch node Vx decreasing, the voltage at node VS3 decreases, and in response to the voltage at node VS3 decreasing increasing, the voltage at node VS2 also decreases.

Figure 7:
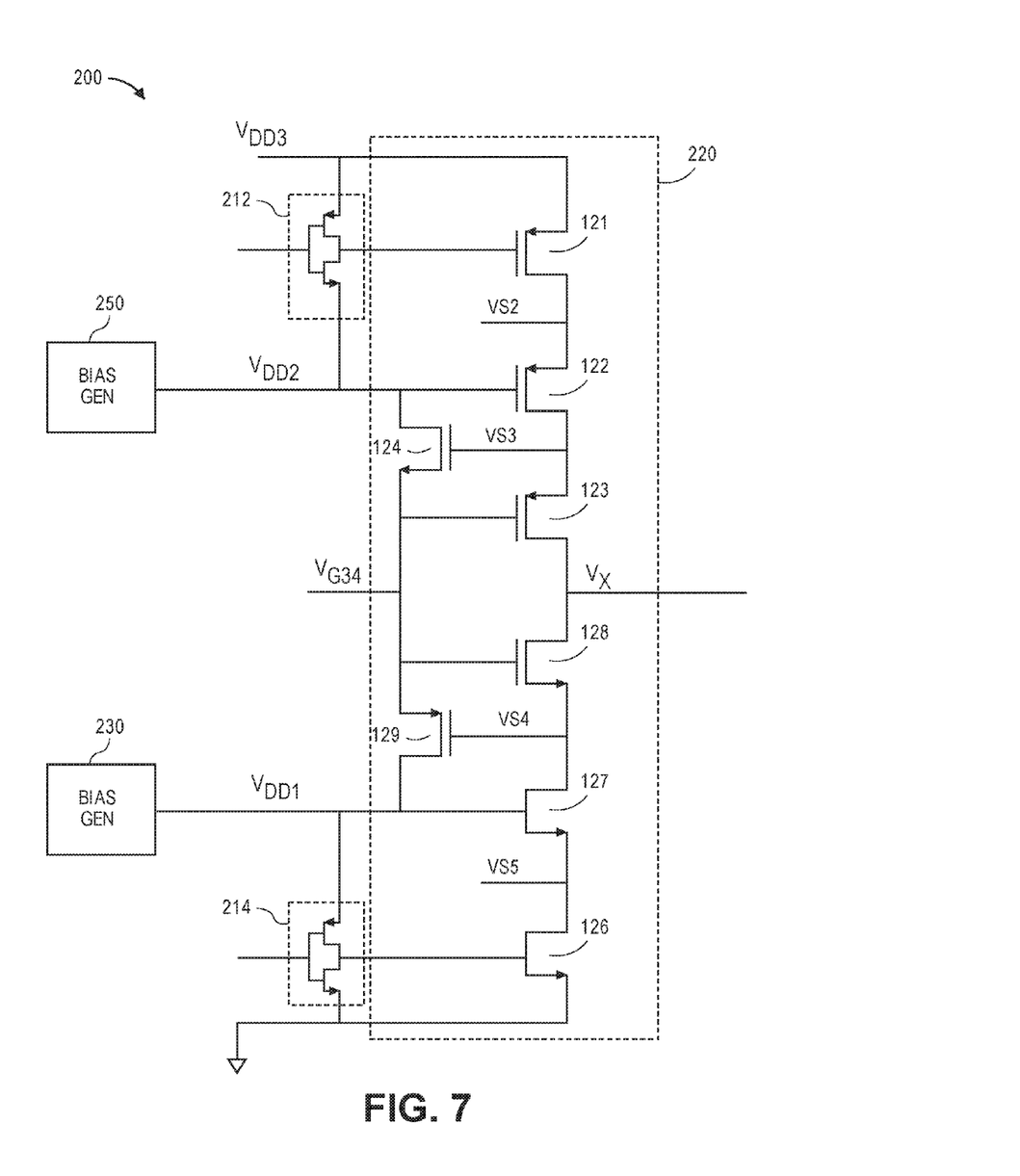
FIG. 7 is a schematic illustration of a portion of a converter connected to bias voltage generators.

FIG. 7 is a schematic illustration of a portion 200 of a converter connected to bias voltage generators 230, 240, and 250. Portion 200 includes inverter 212, inverter 214, and switch stack 220. In some embodiments, inverters 212 and 214 may be part of a PWM controller circuit, such as PWM controller 110 of FIG. 2.

As shown, the power and ground connections for inverter 212 are respectively connected to the input terminal VDD3 and bias voltage input VDD2. As a result, in response to a signal driving inverter 212, inverter 212 causes the gate voltage of MOSFET 121 to be either the voltage at input terminal VDD3 or the voltage at bias voltage input VDD2.

In addition, the power and ground connections for inverter 214 are respectively connected to bias voltage input VDD1 and ground. As a result, in response to a signal driving inverter 214, inverter 214 causes the gate voltage of MOSFET 126 to be either the voltage at the voltage at bias voltage input VDD1 or ground.

Bias voltage generators 230 and 250 are configured to respectively generate the bias voltages at VDD1 and VDD2. Bias voltage generators 230 and 250 may have bias voltage generation architectures as known to those of ordinary skill in the art configured to generate fixed bias voltages.

Figure 8:
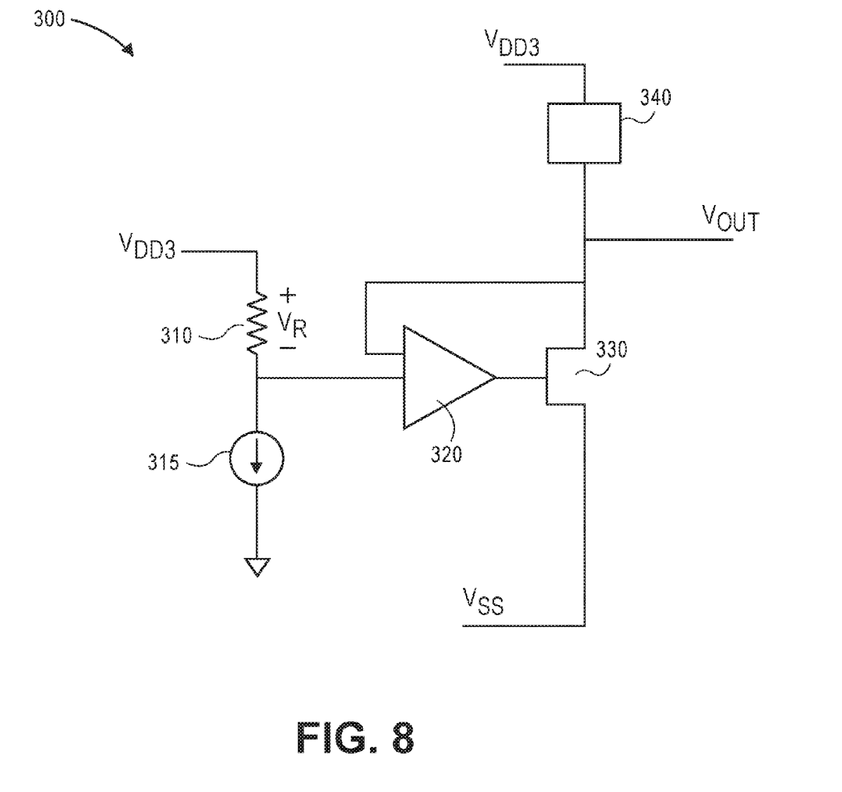
FIG. 8 is a schematic illustration of a bias voltage generator which may be used as a bias generator of the converter of FIG. 4.

FIG. 8 is a schematic illustration of a bias voltage generator 300 which may be used, for example as bias voltage generator 230 to generate the bias voltage at VDD1 in FIG. 6 and/or as bias voltage generator 250 to generate the bias voltage at VDD2 in FIG. 6.

Bias voltage generator 300 includes resistor 310, current source 315, amplifier 320, transistor 330, and pull up device 340.

Resistor 310 and current source 315 collectively generate a reference voltage substantially equal to the bias voltage to be applied to output Vout. The reference voltage is referenced to VDD3, and is a fixed voltage drop VR from the voltage at VDD3. The magnitude of the fixed voltage drop VR is determined by the IR drop in resistor 310.

The reference voltage is applied to amplifier 320, which in cooperation with transistor 330 and pull up device 340 generates the bias voltage applied to Vout.

In the illustrated embodiments, transistor 330 is an N-type transistor, for example, in a common-source configuration. In some embodiments, alternative configurations may be used. In some embodiments, transistor 330 is a P-type transistor, for example, in a source-follower configuration, and connections to the inputs to amplifier 321 are reversed.

Pull up device 340 may comprise one or more of a resistor, a diode-connected transistor, a current source, and a capacitor.

As shown, transistor 330 is connected to Vss. In some embodiments, transistor 330 may provide current to another bias voltage node. For example, if bias voltage generator 300 is used as bias voltage generator 250 of FIG. 6 to generate the bias voltage at node VDD2, the charge flowing through inverter 212 of FIG. 6 from input terminal VDD3 to node VDD2 also flows through transistor 330 to node Vs. Node Vs can be connected to bias node VDD1 so that the charge from transistor 330 can be reused by another circuit receiving current from bias node VDD1, such as inverter 214.

Though the present invention is disclosed by way of specific embodiments as described above, those embodiments are not intended to limit the present invention. Based on the methods and the technical aspects disclosed above, variations and changes may be made to the presented embodiments by those skilled in the art without departing from the spirit and the scope of the present invention.

What is claimed is:

1. A switching voltage converter, comprising:
a controller configured to generate one or more control signals;
a switch stack, comprising six serially connected switches configured to receive a plurality of fixed voltages and the one or more control signals, wherein the switch stack is configured to generate a voltage at a switch node based on the fixed voltages and on the one or more control signals, wherein the one or more control signals are configured to selectively cause the voltage at the switch node to be substantially equal to a first fixed supply voltage or to be substantially equal to a second fixed supply voltage, and wherein the conductivity states of the switches of the switch stack connected to the switch node are controlled by a variable bias signal; and
an output filter connected to the switch node and configured to generate an output voltage based on the voltage at the switch node,
wherein the six serially connected switches comprise:
a first switch connected to a first fixed voltage power supply configured to apply the first fixed supply voltage to the first switch, wherein the first switch is configured to receive a first control signal of the one or more control signals, and wherein a conductivity state of the first switch is controlled by the first control signal;
a sixth switch connected to a second fixed voltage power supply configured to apply the second fixed supply voltage to the sixth switch, wherein the sixth switch is configured to receive a second control signal of the one or more control signals, and wherein the conductivity state of the sixth switch is controlled by the second control signal;
a second switch connected to the first switch, wherein the second switch is configured to receive a second fixed bias voltage, and wherein the conductivity state of the second switch is controlled by a voltage at a node connected to the first and second switches;
a fifth switch connected to the sixth switch, wherein the fifth switch is configured to receive a first fixed bias voltage, and wherein the conductivity state of the fifth switch is controlled by a voltage at a node connected to the fifth and sixth switches;
a third switch connected to the second switch and connected to the switch node, wherein the third switch is configured to receive the variable bias signal; and
a fourth switch connected to the fifth switch and connected to the switch node, wherein the fourth switch is configured to receive the variable bias signal;
wherein the switching voltage converter further comprises seventh and eighth switches configured to cooperatively generate the variable bias signal based on third and fourth control signals, and
wherein the seventh switch is configured to receive the second fixed bias voltage and the eighth switch is configured to receive the first fixed bias voltage, and wherein the seventh and eighth switches are configured to cause the variable bias signal to vary between the voltages of the first and second fixed bias voltages according to the third and fourth control signals.

2. The switching voltage converter of claim 1, wherein the third and fourth control signals are generated by the switch stack.

3. The switching voltage converter of claim 2, wherein the third control signal is generated at a node connected to the second and third switches, and wherein the fourth control signal is generated at a node connected to the fourth and fifth switches.

4. The switching voltage converter of claim 1, wherein the first control signal is configured to switch between the second fixed bias voltage and the first fixed supply voltage, and wherein the second control signal is configured to switch between the first fixed bias voltage and the second fixed supply voltage.

5. The switching voltage converter of claim 1, wherein when the voltage at the switch node is substantially equal to the first fixed supply voltage or is substantially equal to the second fixed supply voltage, the voltage across any two nodes connected to a single switch is less than a breakdown voltage of the single switch.

6. The switching voltage converter of claim 1, wherein the switch stack is connected to a plurality of other nodes, wherein the one or more control signals are additionally configured to selectively not cause the voltage at the switch node to be substantially equal to the first fixed supply voltage or to be substantially equal to the second fixed supply voltage, wherein when the one or more control signals do not cause the voltage at the switch node to be substantially equal to the first fixed supply voltage or to be substantially equal to the second fixed supply voltage, voltage changes at the switch node cause changes in the voltages of the other nodes such that the voltage across any two nodes connected to a single switch is less than a breakdown voltage of the single switch.

7. A switching voltage converter, comprising:
a controller configured to selectively generate first and second control signals;

a switch stack configured to generate a voltage at a switch node based on the control signals, wherein the first and second control signals are configured to selectively cause the voltage at the switch node to be substantially equal to a first fixed supply voltage or substantially equal to a second fixed supply voltage, the switch stack comprising:
  a first switch configured to receive the first control signal,
  a second switch connected to the switch node,
  a third switch connected to the switch node, and
  a fourth switch configured to receive a second control signal,
  wherein the first, second, third, and fourth switches are serially connected, and
  wherein conductivity states of the second and third switches are controlled by control voltages generated by the switch stack; and
an output filter connected to the switch node and configured to generate an output voltage based on the voltage at the switch node,
wherein:
  the first switch is connected to a first fixed voltage power supply configured to apply the first fixed supply voltage to the first switch, and wherein the conductivity state of the first switch is controlled by the first control signal;
  the fourth switch is connected to a second fixed voltage power supply configured apply the second fixed supply voltage to the fourth switch, wherein the fourth switch is configured to receive the second control signal, and wherein the conductivity state of the fourth switch is controlled by the second control signal;
  the second switch is configured to receive a variable bias signal, and wherein the conductivity state of the second switch is controlled by the variable bias signal; and
  the third switch is configured to receive the variable bias signal, wherein the conductivity state of the third switch is controlled by the variable bias signal,
wherein the switching voltage converter further comprises fifth and sixth switches configured to cooperatively generate the variable bias signal based on the control voltages generated by the switch stack, and
wherein the fifth switch is configured to receive a second fixed bias signal and the sixth switch is configured to receive a first fixed bias signal, and wherein the fifth and sixth switches are configured to cause the variable bias signal to vary between the voltages of the first and second fixed bias signals according to the control voltages generated by the switch stack.

8. The switching voltage converter of claim 7, wherein when the voltage at the switch node is substantially equal to the first fixed supply voltage or is substantially equal to the second fixed supply voltage, the voltage across any two nodes connected to a single switch is less than a breakdown voltage of the single switch.

9. The switching voltage converter of claim 7, wherein the switch stack is connected to a plurality of other nodes, wherein the first and second control signals are additionally configured to selectively not cause the voltage at the switch node to be substantially equal to the first fixed supply voltage or to be substantially equal to the second fixed supply voltage, wherein when the first and second control signals do not cause the voltage at the switch node to be substantially equal to the first fixed supply voltage or to be substantially equal to the second fixed supply voltage, voltage changes at the switch node cause changes in the voltages of the other plurality of other nodes such that the voltage across any two nodes connected to a single switch is less than a breakdown voltage of the single switch.

10. A switch stack, comprising six serially connected switches configured to receive a plurality of fixed voltages and one or more control signals,
  wherein the switch stack is configured to generate a voltage at a switch node based on the fixed voltages and on the one or more control signals,
  herein the one or more control signals are configured to selectively cause the voltage at the switch node to be substantially equal to a first fixed supply voltage or to be substantially equal to a second fixed supply voltage,
  wherein the six serially connected switches comprise:
    a first switch connected to a first fixed voltage power supply, wherein the first switch is configured to receive a first control signal of the one or more control signals, and wherein a conductivity state of the first switch is controlled by the first control signal;
    a sixth switch connected to a second fixed voltage power supply, wherein the sixth switch is configured to receive a second control signal of the one or more control signals, and wherein the conductivity state of the sixth switch is controlled by the second control signal;
    a second switch connected to the first switch, wherein the second switch is configured to receive a second fixed bias voltage, and wherein the conductivity state of the second switch is controlled by a voltage at a node connected to the first and second switches;
    a fifth switch connected to the sixth switch, wherein the fifth switch is configured to receive a first fixed bias voltage, and wherein the conductivity state of the fifth switch is controlled by a voltage at a node connected to the fifth and sixth switches;
    a third switch connected to the second switch and connected to the switch node, wherein the third switch is configured to receive a variable bias signal; and
    a fourth switch connected to the fifth switch and connected to the switch node, wherein the fourth switch is configured to receive the variable bias signal;
  wherein the switch stack is connected to seventh and eighth switches configured to cooperatively generate the variable bias signal based on third and fourth control signals, wherein the third and fourth control signals are generated by the switch stack, and
  wherein the seventh switch is configured to receive the second fixed bias voltage and the eighth switch is configured to receive the first fixed bias voltage, and wherein the seventh and eighth switches are configured to cause the variable bias signal to vary between the voltages of the first and second fixed bias voltages according to the third and fourth control signals.

11. The switch stack of claim 10, wherein when the voltage at the switch node is substantially equal to the first fixed supply voltage or is substantially equal to the second fixed supply voltage, the voltage across any two nodes connected to a single switch is less than a breakdown voltage of the single switch.

12. The switch stack of claim 10, wherein the switch stack is connected to a plurality of other nodes, wherein the one or more control signals are additionally configured to selectively not cause the voltage at the switch node to be substantially equal to the first fixed supply voltage or to be substantially equal to the second fixed supply voltage, wherein when the one or more control signals do not cause the voltage at the switch node to be substantially equal to the first fixed supply voltage or to be substantially equal to the second fixed supply voltage, voltage changes at the switch node cause changes in the voltages of the other nodes such that the voltage across any two nodes connected to a single switch is less than a breakdown voltage of the single switch.

* * * * *